United States Patent [19]

Pine et al.

[11] Patent Number: 5,075,799
[45] Date of Patent: Dec. 24, 1991

[54] MAGNIFYING LENS ATTACHMENT FOR INFORMATION DISPLAY SELECTIVE CALL RECEIVER

[75] Inventors: Jerrold S. Pine, Boca Raton; David H. Rubin, Sunrise, both of Fla.

[73] Assignee: Motorola, Inc., Schaumburg, Ill.

[21] Appl. No.: 379,842

[22] Filed: Jul. 14, 1989

[51] Int. Cl.$^5$ .................. G02B 27/02; G08B 5/22; A45F 5/00
[52] U.S. Cl. ................................ 359/896; 359/440; 340/825.44; 224/252
[58] Field of Search .............. 350/321, 114, 115, 116; 340/825, 825.36, 825.44, 825.56; 29/243.51, 243.53, 243.56; 224/252, 269

[56] References Cited

U.S. PATENT DOCUMENTS

| | | | |
|---|---|---|---|
| 3,537,776 | 11/1970 | Connito | 350/116 |
| 3,887,791 | 6/1975 | Kitchens | 350/284 |
| 4,451,117 | 5/1984 | Goode | 350/114 |
| 4,635,836 | 1/1987 | Mooney et al. | 224/252 |
| 4,775,083 | 10/1988 | Burger et al. | 224/240 |
| 4,956,895 | 9/1990 | Hayasaka | 224/252 |

Primary Examiner—Bruce Y. Arnold
Assistant Examiner—James Phan
Attorney, Agent, or Firm—Gregg Edward Rasor; Vincent B. Ingrassia; William E. Koch

[57] ABSTRACT

An apparatus is described for the magnification of an information display on a selective call receiver. The apparatus comprises an optical lens system coupled in a manner which provides for its easy attachment and removal from the selective call receiver.

2 Claims, 1 Drawing Sheet

MAGNIFYING LENS ATTACHMENT FOR INFORMATION DISPLAY SELECTIVE CALL RECEIVER

FIELD OF THE INVENTION

This invention relates in general to selective call receivers and more particularly to the magnification of an information display using a detachable lens system.

BACKGROUND OF THE INVENTION

Selective call information display devices are characterized by the reception of data by a selected selective call receiver. When selected, the device responds by sensibly alerting and presenting data to the user with an information display.

As technology advances, the miniaturization of selective call receivers and their information display presents a problem to the visually impaired. The small characters presented on the information display cannot be easily read and need to be enlarged. Enlarging the characters by increasing the physical size of the information display beyond the size of the receiver's housing poses problems in ergonomics, structural integrity, and reliability. For example, if a liquid crystal display, hereafter referred to as a LCD, is used for the information presentation means, the LCD requires a rigid mounting structure which is isolated from mechanical shock to prevent breakage of the LCD. If an enlarged LCD is mounted in a manner which allows it to protrude from the housing, the criteria of maintaining structural integrity, high reliability, and acceptable ergonomics cannot be met.

Thus, what is needed is an apparatus for magnifying the information presented on an information display of a selective call receiver.

SUMMARY OF THE INVENTION

Accordingly, it is an object of the present invention to provide for the magnification of the information display on a selective call receiver.

Another object of the invention is to provide for easy attachment and removal of a magnifying lens system coupled to the information display on a selective call receiver.

In carrying out the above and other objects of the invention in one form, there is provided an apparatus for magnifying the information presented on an information display of a selective call receiver, the apparatus being removably secured to the selective call receiver.

The above and other objects, features, and advantages of the present invention will be better understood from the following detailed description taken in conjunction with the accompanying drawings.

DETAILED DESCRIPTION OF THE INVENTION

Figure 1:
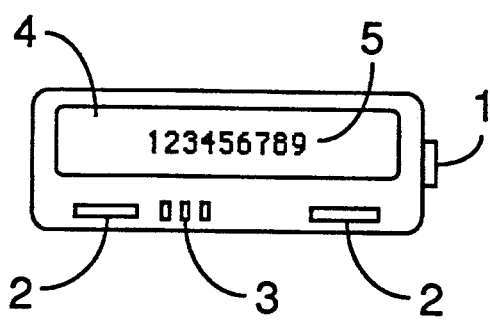
FIG. 1 is a top view of a prior art information display as viewed under normal conditions.

Referring to FIG. 1, a prior art selective call receiver comprises an on/off switch 1, function control switches 2, an alert port 3, and an information display 4. The information display 4 displays the characters 5 in a size that may be difficult to read for those users having impaired vision.

Figure 2:
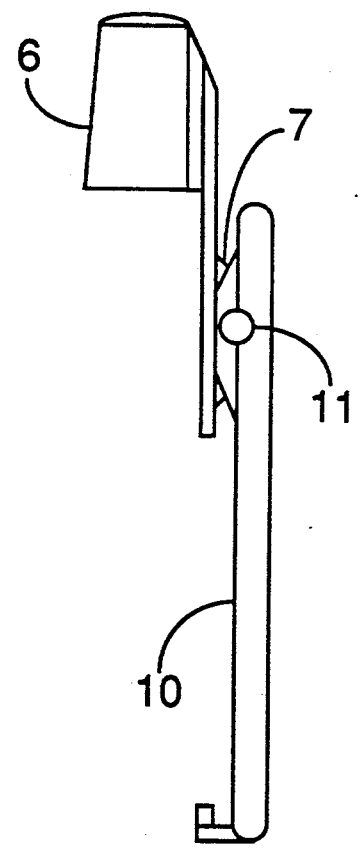
FIG. 2 is a side view of the preferred embodiment of the present invention.
Figure 3:
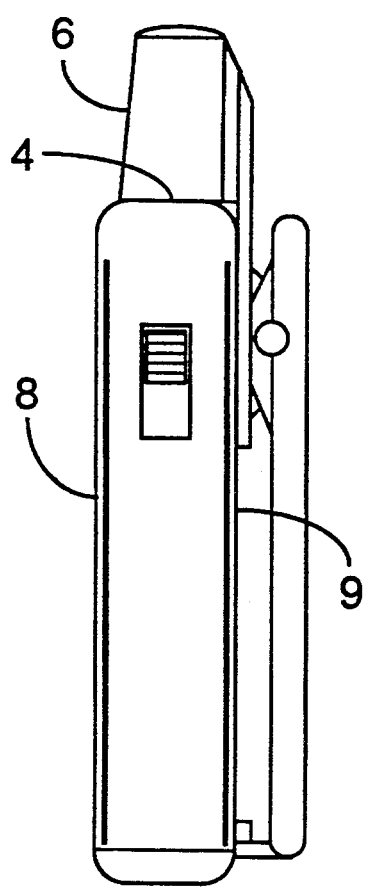
FIG. 3 is a side view of the preferred embodiment attached to a selective call receiver.

Referring to FIGS. 2 and 3, the magnifier attachment in accordance with the preferred embodiment includes a lens system 6 as an integral part of the mounting bracket 7. The mounting bracket 7 is designed such that the magnifier can be easily attached and removed from the selective call receiver 8, such as by sliding into a slot on the back 9 of the selective call receiver. The belt clip 10 is mounted to the bracket 7 by a pin 11, giving the belt clip freedom to rotate about the axis of the pin 11.

Referring to FIG. 3, the selective call receiver is shown with the magnifier attached. Coupling of the information display 4 to the magnifying lens system 6 is accomplished by positioning the body of the lens system 6 in a plane parallel to the orientation of the information display 4.

Figure 4:
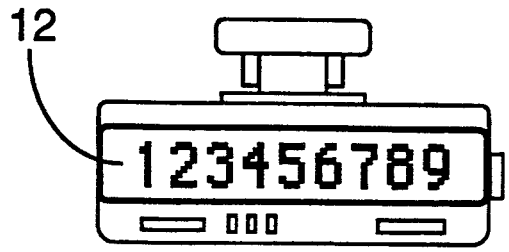
FIG. 4 is a top view of an information display as viewed with the preferred embodiment installed.

Referring to FIG. 4, the enlarged size of information displayed is illustrated with the preferred embodiment attached to the selective call receiver 8. Note the increased size of the characters 12 relative to the characters 5 shown in FIG. 1.

By now it should be appreciated that there has been provided an apparatus removably secured to a selective call receiver display for magnifying characters appearing therein.

We claim:

1. An apparatus for presenting characters appearing on a selective call receiver display, comprising:
   magnifying means for magnifying characters; and
   attachment means coupled to said magnifying means for removably securing said magnifying means to said receiver, said attachment means including a belt clip for coupling said receiver to an object.

2. An apparatus for presenting information presented on an information display of a selective call receiver comprising:
   first means for magnifying said information presented on said information display; and
   second means for removably attaching said first means to said selective call receiver, said second means including a belt clip for coupling said selective call receiver to an object.

* * * * *